INVENTORS.
Ralph E. Cross,
Werner H. Jessen.
BY
Harness, Dickey & Pierce.
ATTORNEYS.

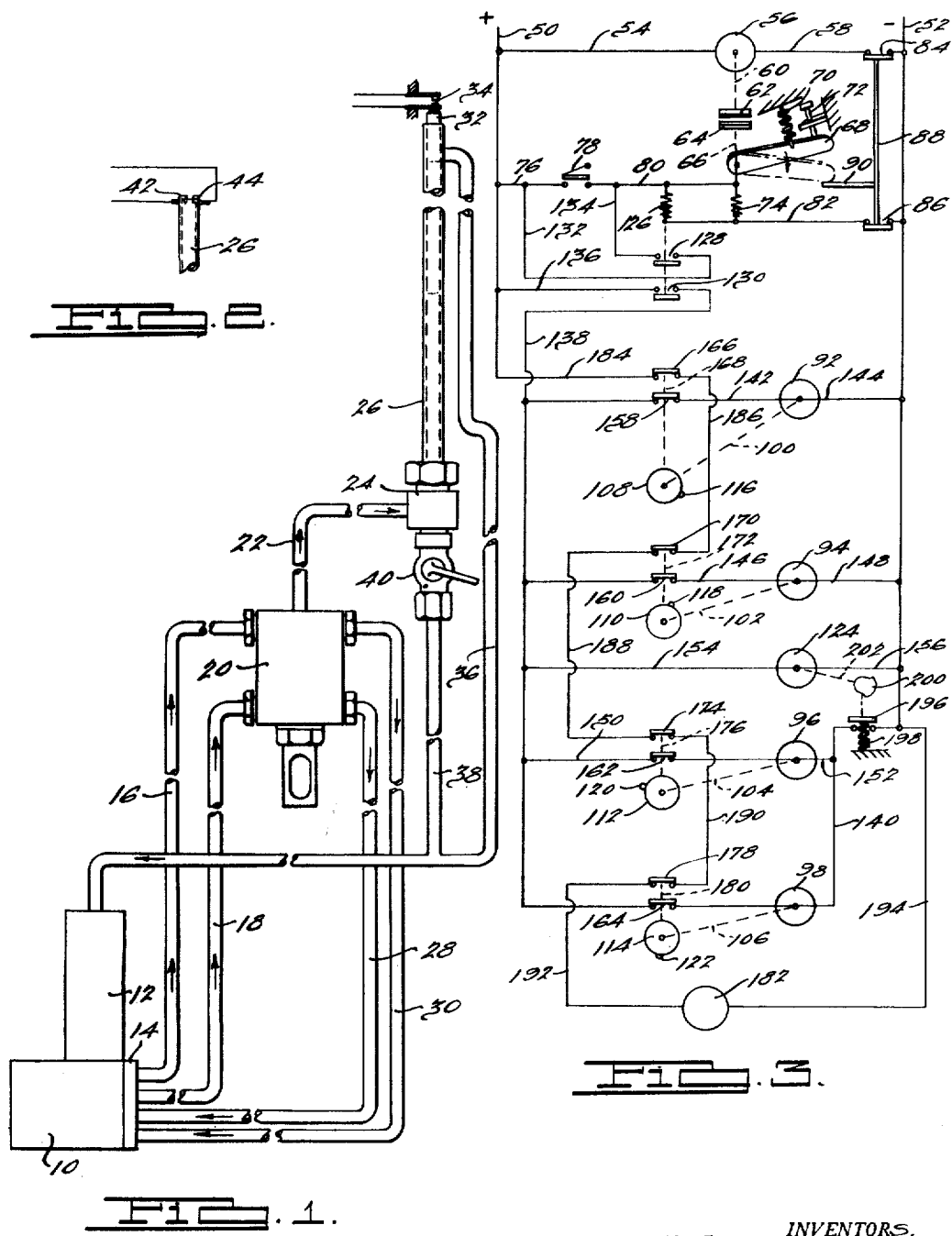

Patented May 18, 1954

UNITED STATES PATENT OFFICE 2,679,038

APPARATUS FOR RECORDING AND CONTROLLING MACHINE-TOOL OPERATION

Ralph E. Cross, Grosse Pointe Shores, and Werner H. Jessen, Southfield Township, Oakland County, Mich., assignors to The Cross Company, Detroit, Mich., a corporation of Michigan Application May 16, 1950, Serial No. 162,176

20 Claims. (Cl. 340—267)

This invention relates to new and useful improvements in apparatus for recording the life of or wear on cutting tools.

Many types of machines, and particularly large multiple-spindle machines, are equipped with so many individual cutting tools that it is impossible for the operator to observe and keep account of all the tools. As a result, tools are often operated beyond their life expectancy and are broken or damaged beyond repair. When this condition exists, machines are overloaded and sometimes damaged, tool changing becomes a hit-and-miss operation causing loss of machine efficiency and valuable production time.

An important object of this invention is to provide an apparatus that automatically keeps track of the wear on each tool and that automatically shuts down the machine when the calculated life of any particular tool has expired.

Another object of the invention is to provide an apparatus of the above-mentioned character that indicates visually which tool needs replacing so that the operator can easily and quickly substitute a new tool for the worn one.

Still another object of the invention is to provide an apparatus of the above-mentioned character that includes a tool-control board on which the visual indicator is mounted and wherein a replacement tool and a gauge block for setting the tool in the machine are mounted side by side with the indicator for convenience in replacing the worn tool.

Other objects and advantages of the invention will be apparent during the course of the following description.

Figure 4:
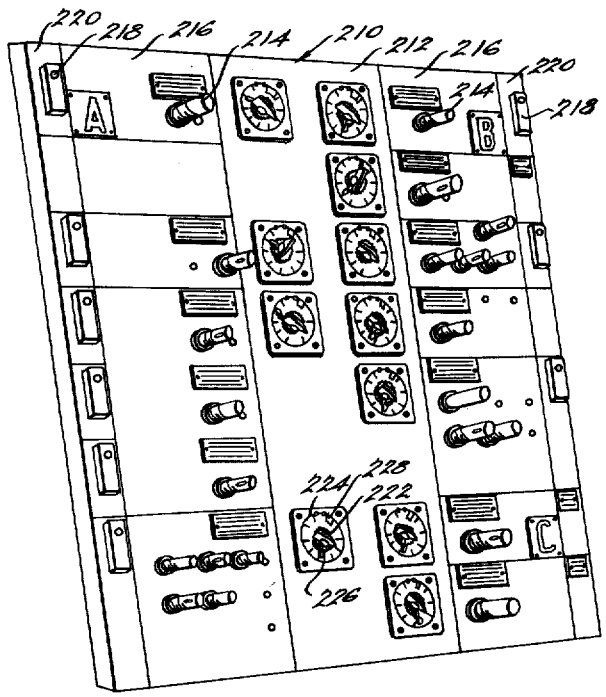
Figure 5:
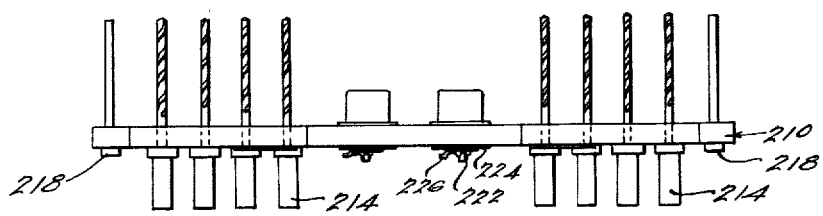

In the drawings forming a part of this specification and wherein like numerals are employed to designate like parts throughout the same, Fig. 1 is a schematic view of a fluid system for visually indicating wear on the cutting tools, Fig. 2 is a fragmentary view showing a modified construction of the type illustrated in Fig. 1, Fig. 3 is a diagrammatic view of an electrical system embodying the invention, Fig. 4 is a tool-control board comprising a part of the invention, and Fig. 5 is a top plan view of the board.

Reference is first had to Fig. 1 which shows a fluid system for recording the life of a cutting tool. "Tool life" as used in the application means the estimated number of operations a tool will perform between grinds. Broadly, the apparatus comprises a fluid pump, a glass tube for each cutting tool or group of similar tools in the machine connected to receive fluid from the pump, and metering valves for regulating the amount of liquid charged to the tubes by the pump.

The operation of the pump is co-ordinated in any suitable manner with the operation of the machine so that the amount of liquid charged by the pump to the tubes constitutes an index of the wear on the tools in the machine. Usually this can best be done by operating and controlling the pump from the index or transfer control circuit of the machine. The metering valves are adjusted to displace a given amount of fluid for each operation of the index cycle, and the fluid is pumped into the transparent tubes which are visible to the operator. Thus, the amount of fluid in the tubes provides a visual record of the life and consequently the amount of wear on the tools. For example, if the tool or group of tools identified by a tube has a calculated life of one hundred cycles, the metering valve is adjusted to charge an amount of fluid equal to one one-hundredth of the capacity of the tube for each operating cycle of the machine. Thus, the tube is filled when the machine has cycled one hundred times, and the filled tube indicates to the operator that the tool or group of tools identified by the tube needs replacement. The operator then changes the tool or tools and resets the device by draining the tube. Different tools frequently have different calculated life spans and it may be necessary to charge different amounts of liquid to the various tubes or to vary the size of the tubes themselves, depending upon the exigencies of the particular situation. Preferably, means is provided for shutting down the machine when any particular tube becomes filled so that no tool will be operated beyond its expected or calculated life span.

For a detailed description of the invention, attention is directed to Fig. 1 which shows a relatively simple system having a single indicator tube and one metering valve. It will be readily apparent, however, that any desired number of tubes and valves may be used and it will be appreciated that the utility of the apparatus increases directly as the number of tools in the machine. In a multiple-tube system, the tubes are connected to a common supply line, and the branch line leading to each tube is controlled by a separate metering valve. The pump which supplies the fluid to the tubes must of course have at least sufficient capacity to supply all the tubes.

The system shown in Fig. 1 is equipped with a conventional double-plunger pump 10 having a fluid reservoir 12 and provided with a reversing valve designated generally at 14. Dual discharge pipes 16 and 18 extend from the outlets of reversing valve 14 to the inlets of a conventional hydraulic measuring valve 20. The valve 20 ejects a measured amount of the liquid charged thereto into a pipe 22 which leads to a fitting 24 at the bottom of and communicating with a vertical glass indicator tube 26. Any excess liquid charged to valve 20 is returned to the pump through pipes 28 and 30. In and extending upwardly from the upper end of tube 26 is a float member 32 which actuates a normally open switch 34 in the control circuit of the machine. Float member 32 normally closes the upper end of an overflow line 36 which leads back to the fluid reservoir 12. Liquid rising in tube 26 lifts the float member 32 to close switch 34, and when the float member is raised sufficiently to close switch 34, it opens the overflow line 36 so that any excess fluid charged to the tube is merely returned to the reservoir 12. A drainpipe 38 controlled by valve 40 extends downwardly from fitting 24 and connects with the overflow pipe 36 as shown so that liquid in the tube 26 can be drained to the reservoir 12 when desired.

In operation, the pump 10 is connected in the control circuit of the machine so that it is operated once for each operating cycle of the machine. Conveniently, the pump can be operated by and during the index or transfer cycle of the machine. The pump charges fluid alternately to pipes 16 and 18 and, as suggested, fluid charged to the metering valve 20 from either of the pipes 18 is discharged to the tube through pipe 22. In this manner a measured amount or increment of liquid is charged to the indicator tube 26 for each operating cycle of the machine. An equal amount of liquid is charged to the tube for each operating cycle, and as these liquid increments accumulate, the tube is progressively filled with the liquid. Thus, the level of liquid in the tube 26 at any given time is a function of the wear on the cutting tool or tools identified by the tube. As suggested, the amount of liquid charged to the tube 26 is co-ordinated with the expected life span of the cutting tool or tools so that the tube is filled and operates the float 32 to close switch 34 at the end of the calculated life span of the tool.

The switch 34 can be connected in the control circuit of the machine in any known or desired manner. For example, the switch 34 can be connected in the electrical circuit of the machine so that, when closed, it energizes a relay which in turn opens a switch in the main control circuit of the machine so that the machine is shut down until the worn tool has been replaced and the liquid has been drained from the tube by opening valve 40. When the valve 40 is again closed, the apparatus is reset for further operation.

Fig. 2 shows a modified construction wherein two electrical contacts 42 and 44 are mounted at the top of tube 26. This form of the invention is particularly suitable for use with an electrically conducting liquid such as mercury or the like. When the liquid in tube 26 rises sufficiently to engage contacts 42 and 44, a circuit is completed which breaks the electrical circuit supplying the machine. This automatically terminates the machine cycle when any tool in the machine has reached its limit, thereby making it mandatory for the operator to change the tool and drain the tube 26 before the machine can again proceed.

Attention is now directed to Fig. 3 which shows another form of the invention using an electrical apparatus instead of the fluid apparatus first described. In many ways the electrical apparatus is superior to the fluid apparatus and for most installations it is the preferred form.

Considered in certain of its broader aspects, this form of the invention comprises an electrical circuit having an indicator instrument for registering and measuring the life of each tool or of a group of similar tools in the machine and all controlled by a master timer. The indicators provide a visual record of the used and unused portions of the tools. The master timer is connected to the operating circuit of the machine and provides operating current intermittently for the indicators. As in the case of the prime mover in the form of the invention first described, the master timer conveniently may be energized by the action of the transfer bar or index mechanism of the machine. The indicators are provided with dials and indicating hands which travel toward zero as the master timer feeds current to them. When any indicating hand reaches zero, an electrical contact is made which opens the control circuit of the machine and prevents further operation thereof. When the machine is shut down in this manner the operator merely locates the dial which has completed its cycle of operation, changes the tool identified thereby, resets the dial, and restarts the machine.

More specifically, current from any suitable source of electrical energy is supplied to the timing and control circuit embodying the invention through lines 50 and 52. Current from the positive line 50 flows through line 54 to the master timer motor 56 and thence through line 58 to the negative line 52. The motor shaft, designated generally at 60, carries a driving clutch member 62 which co-operates with a driven clutch member 64 on shaft 66 to rotate or oscillate a switch-actuating arm 68. These parts are illustrated diagrammatically in the drawing and the arm 68 is oscillated against the action of a spring 70 which normally holds the arm against an adjustable stop 72. The shaft 66 is oscillated axially to engage and disengage clutch members 62 and 64 by a relay 74 which is connected across the main lines 50 and 52 by line 76, main control switch 78, and lines 80 and 82. Normally closed switches 84 and 86 are provided in lines 58 and 82 respectively, and the switches are interconnected by member 88 for mutual operation. The lateral arm 90 on the interconnecting member 88 is disposed for engagement by switch arm 68.

Thus, in the circuit here shown by way of illustration, the master timer motor 56 operates continuously as long as electrical energy is supplied to lines 50 and 52. However, clutch members 60 and 62 normally are disengaged so that no useful purpose is served by energization of the motor 56. However, as soon as the starting switch 78 is closed, and this switch conveniently may be located for actuation by some part of the machine, the relay 74 is energized to engage clutch members 62 and 64. When the clutch members engage, arm 68 is rotated or oscillated in the direction of the arrow until it engages arm 90 and opens switches 84 and 86. Switch 84 opens the circuit through motor 56, and switch 86 deenergizes relay 74 to again disengage clutch members 62 and 64. Thus, the circuit remains energized only during the time it takes arm 68 to move from its initial full-line position to the dotted-line position. In one installation the circuit was energized for exactly three seconds.

Also connected in the circuit are indicators having motors designated 92, 94, 96, and 98. It will be readily appreciated in this connection that four indicators are here shown merely by way of illustration. In actual practice there may be a hundred or more of these indicators. The actual number in any particular instance of course depends upon the number of cutting tools in the machine. One indicator usually will be provided for each tool in the machine. The shafts 100, 102, 104, and 106 of indicator motors 92, 94, 96, and 98 are equipped with cams 108, 110, 112, and 114 having radial projections 116, 118, 120, and 122 respectively. The cams are adjustable to an initial position, and the cam projections are advanced progressively by their respective motors which, as pointed out above, are energized for a short period of time during each operating cycle of the machine. As hereinafter brought out in detail, when any of the cams has completed its cycle of rotation it opens a switch to de-energize the circuit and shut down the machine.

Indicators are available on the market which operate for from five minutes to ten hours. Thus if a five-minute indicator is energized for three seconds during each operation of the machine, it has a maximum capacity to count out one hundred cycles. A ten-hour indicator, on the other hand, has a maximum capacity of twelve thousand cycles. If it is necessary to count a still larger number of cycles, an interrupter timed may be introduced into the circuit. Interrupter timers further divide the time of the master timer thus providing smaller time intervals of current for the indicators. In this way it is possible to obtain counts as high as two hundred thousand. An interrupter timer motor 124 is shown in the instant circuit and, by way of illustration, indicators 96 and 98 only are controlled by the interrupter timer.

More specifically, the part of the circuit which supplies the indicators and the interrupter timer includes a relay 126 which is connected to lines 80 and 82 and operates the normally open switches 128 and 130. Switch 128 is in a holding circuit which shunts the main switch 78 and comprises lines 132 and 134. Switch 130, on the other hand, is in the main circuit which feeds the indicator motors 92, 94, 96, and 98 and the interrupter timer motor 124.

More specifically, current flows through the switch 130 from line 50 through line 136, thence through line 138 to the auxiliary timer motor 98, and thence through line 140 back to the negative side 52 of the circuit.

Current flows from line 138 through 142 to the indicator motor 92 and thence to the negative side 52 of the circuit through line 144.

Current also travels to indicator motor 94 through line 146 thence through line 148 to the negative side 52 of the circuit.

Similarly current travels to the indicator motor 96 through line 150, and the motor is connected to line 140 by line 152.

The interrupter timer motor 124 is connected between lines 138 and 52 ahead of indicator motors 96 and 98 by lines 154 and 156.

Normally closed switches 158, 160, 162, and 164 are connected in lines 142, 146, 150, and 138 which supply indicator motors 92, 94, 96, 98 respectively, and these switches are operated by the cams 108, 110, 112, and 114 of the indicator motors. Also, a switch 166 is connected as at 168 to operate in unison with switch 158, a switch 170 is connected as at 172 to operate in unison with switch 160, a switch 174 is connected as at 176 to operate in unison with switch 162, and a switch 178 is connected as at 180 to operate in unison with switch 164. Switches 166, 170, 174, and 168 are connected in series with each other and with the starter 182 of the machine by lines 184, 186, 188, 190, and 192, and the starter is connected to the negative side 52 of the circuit by line 194. Line 140 which carries current traversing the indicator motors 96 and 98 is controlled by a switch 196 which is held normally open by spring 198 and is closed against the action of the spring by a cam 200 on the shaft 202 of the interrupter motor 124. The lobe of cam 200 extends around one third of the cam surface so that the switch 196 and consequently indicator motors 96 and 98 are energized every third operation of the machine.

Thus, if it is assumed that the master timer energizes the circuit for three seconds during each operation of the machine, it will be readily apparent that the indicator motors 92 and 94 and the interrupter timer motor 124 are energized for the full three seconds' interval. During this time the motors will rotate the cams 108, 110, and 200. Since indicator motors 96 and 98 are controlled by the cam 200, they are energized every third cycle of the machine and thus operate only one third as fast as the other indicators. As soon as any of the indicator cams has completed its cycle of operation it opens the switches associated therewith and thus prevents energization of the motor associated therewith and of the machine starter 182. When this occurs the machine is shut down, the operator locates the indicator responsible for the shutdown, changes the tool or the group of tools identified by the indicator, and resets the indicator to its normal initial position. The machine is then free to operate until another indicator shuts down the machine and thus lets the operator know that another tool or group of similar tools has operated for its full calculated life expectancy.

For convenience, the indicators preferably are mounted on a tool-control board 210 as shown in Figs. 4 and 5. For greatest convenience in operation, the indicators preferably are mounted on a middle panel 212. Replacement tools 214 are mounted in separate panels 216 disposed on opposite sides of and adjacent to the middle panel 212, and conventional gauge blocks 218 for use in placing the tools in the machine are mounted in outside panels 220. The indictors and their respective tools and gauges conveniently may be grouped to designate the different operating heads of the machine, and the various areas of the board occupied by the groups preferably are painted distinctive contrasting colors to assist the operator in locating any particular tool on the machine. In the drawings, the board 210 is divided into three sections designated A, B, and C respectively. The indicators are permanently mounted on the middle panel 212. The tools 214 and gauges 218 are removably mounted on their respective panels as by insertion through suitably located openings in the panels.

The indicators conveniently are equipped with indicating pointers 222 which travel around a dial or scale 224 so that the operator can tell at a glance the amount of wear on any particular tool and can easily ascertain approximately how long it will be before any particular tool needs replacement. The dials 224 are equipped with adjustable stops 226 and when the indicator is reset the pointer 222 is turned back against the stop 226.

In this manner the indicator can be readily adjusted to operate for any particular interval within its range of operation. In the particular board here shown by way of illustration, each dial 224 is provided immediately adjacent to and in front of the zero position with a red stripe 228 which constitutes a warning area. When the pointer 222 enters the red area 228 of any indicator the operator is immediately apprised that the tool or group of tools identified by the indicator will soon require replacement.

The red warning area 228 designates a predetermined period of operation for the machine, and it is proposed that the operator change not only the tool or tools identified by the indicator which shuts down the machine but also any tool or tools identified by indicators having pointers within the red area 228. In one installation the red areas 228 of the various indicators were of a size to designate two hours of operation by the machine. Thus, if the operator changes the tools as suggested above he is assured that the machine will have at least two hours of continuous operation before another shutdown occurs. Thus, the provision of the red areas 228 on the dials and operation of the machine in the manner described prevents the machine from being shut down repeatedly in a short time by the instant apparatus. In some of the larger machines having a hundred or more cutting tools, production time of the machine is of primary importance.

It may thus be seen that we have achieved the objects of our invention. We have provided an apparatus that can be readily adapted to any machine tool. The recording devices of the apparatus automatically keep track of every tool in the machine, prevent the tools from being operated beyond their expected life span, prevent damage to the tools and to the machine, assure efficiency in operation, and prevent loss of valuable production time.

Having thus described the invention, we claim:

1. A machine having a tool, means for actuating said tool including an electrical operating circuit for the machine and a movable part operable in timed relation with said tool, electrically operated indicator means, an electrical control circuit connected to said indicator means, a master timer electrically connected to said control circuit operable to energize said indicator means for a predetermined period of time during each operation of the timer, a switch in said control circuit controlling said master timer and operable by the mentioned part of the machine to energize said timer once for each operation of the tool, said indicator means including a dial having indicia thereon representing the life span of said tool and said indicia having a terminal point, a rotatable adjustable stop movable around said dial from said terminal point to a position representing an estimated life span for said tool, a rotatable pointer movable around said dial between said terminal point and said stop, said pointer being positionable against said stop and operable during energization of said indicator means by said master timer so that successive operations of the machine indexes said pointer progressively around said dial toward said terminal point, and means adjacent the terminal point of said dial co-operable with said pointer to indicate when the latter is a selected time interval in terms of machine operation from said terminal point.

2. In combination with a machine having a movable tool and a part operable once for each operation of said tool, a dial having indicia thereon designating a life span of said tool, and an electrically operated mechanism including a pointer on and rotatable relative to said dial, an electric circuit for said mechanism, a timer mechanism operated by said part and controlling said circuit for energizing said mechanism for a predetermined period of time so as to advance said pointer one increment of dial space for each operation of said tool, a rotatably adjustable stop on said dial engageable with said pointer and positionable to locate the pointer initially at a selected starting position on the dial representing the estimated life span of said tool, and indicia on said dial cooperable with said pointer to designate when a predetermined time interval in terms of machine operation remains of the estimated life span of said tool.

3. In combination with a machine having a movable tool and a part operable in timed relation with said tool, an electrically operated mechanism including coactive stationary and rotatable members, one of said members being in the form of a dial and the other of said members being in the form of a pointer, means on said dial designating a life span of said tool, an electric circuit for said mechanism, a timer mechanism operated by the mentioned part of said machine controlling said circuit for energizing said mechanism for a predetermined period of time and operative to rotate said rotatable member as a consequence of tool operation, adjustable stop means coactive with said rotatable member to locate the same initially at a selected starting position relative to said stationary member representing an estimated life span of said tool, and means on said stationary member coactive with said rotatable member for designating when a predetermined time interval in terms of machine operation remains of the estimated life span of said tool.

4. In combination with a machine having a movable tool and a part operable in timed relation with said tool, a dial having indicia thereon designating a life span of said tool, an electrically operated mechanism including a pointer on and rotatable relative to said dial, an electric circuit for said mechanism, a timer mechanism operated by said part and controlling said circuit for energizing said mechanism to move said pointer a predetermined distance on said dial for each operation of said tool, a rotatably adjustable stop on said dial engageable with said pointer and positionable to locate the pointer initially at a selected starting position on the dial representing the estimated life span of said tool, and means on said dial co-operable with said pointer to designate when a predetermined time interval in terms of machine operation remains of said estimated life span.

5. In combination with a machine having a movable tool and a part operable in timed relation with said tool, an electrically operated mechanism including relatively rotatable members, one of said members being manually rotatable relative to the other of said members to a selected starting position representing an estimated life span of said tool, an electric circuit for said mechanism, a timer mechanism operated by said part and controlling said circuit for energizing said mechanism as a consequence of tool operation to move said one member relative to said other member a predetermined distance for each operation of the tool, adjustable stop means coactive with said rotatable member to locate the same initially at a selected starting position relative to said other member, and means coactive with said rotatable member for designating when a predetermined time interval in terms of machine operation remains of said estimated life span.

6. In combination with a machine having a movable tool and a part operable in timed relation with said tool, a dial having indicia thereon designating a life span of said tool, an electrically operated mechanism including a pointer on and rotatable relative to said dial, an electric circuit for said mechanism, a timer mechanism operated by said part and controlling said circuit for energizing said mechanism to move said pointer a predetermined distance on said dial for each operation of said tool, stop means on said dial engageable with said pointer and positionable to locate the pointer initially at a selected starting position on the dial representing the estimated life span of said tool, and means cooperable with said pointer to designate when a predetermined time interval in terms of machine operation remains of the estimated life span of said tool.

7. In combination with a machine having a movable tool and a part operable in timed relation with said tool, a dial, means on said dial designating a life span of said tool, an electrically operated mechanism including a pointer on and rotatable relative to said dial, said pointer being initially manually rotatable to a selected starting position on the dial representing the estimated life span of said tool, an electric circuit for said mechanism, a timer mechanism operated by said part and controlling said circuit to energize said mechanism in accordance with tool operation to advance said pointer a predetermined distance on said dial for each operation of said tool and means co-operable with said pointer to designate when a predetermined time interval in terms of machine operation remains of the estimated life span of said tool.

8. In an electrical control system for a machine having a tool which has an estimated life the magnitude of which is a function of the work performed thereby, at least one switching apparatus including a circuit-controlling device and an energizable element for actuating said circuit-controlling device, a first control circuit for such machine including a portion of said controlling device, said portion normally being effective to maintain said circuit in a normal condition to render such machine in a condition to perform its intended function, a second control circuit including said energizable element and a portion of said controlling device and normally maintained in a normal operating condition by said controlling device, a second circuit-controlling device actuatable from a first circuit-controlling condition to a second circuit-controlling condition as a function of the work performed by such tool, said second circuit-controlling device being associated with said second circuit and effective when said second circuit is in its normal condition to actuate said energizable element as a function of the work performed by such tool, said switching apparatus further including means actuated as a function of the energization of said energizable element to actuate said first-named circuit controlling device to render said circuits out of their respective said normal conditions.

9. In an electrical control system for a machine provided with a tool having an estimated life which is a function of the work performed thereby, at least one switching apparatus including a first circuit-controlling device and an energizable element for actuating said circuit-controlling device, a first control circuit for said machine including a portion of said controlling device, said portion normally conditioning said circuit to render said machine operative, a second circuit-controlling device actuatable as a function of the work performed by said tool, and a second control circuit associated with said second circuit-controlling device and including said energizable element and a portion of said first circuit-controlling device normally conditioned by said controlling devices to energize said energizable element as a function of the work performed by said tool, said switching apparatus further including means actuated as a function of the energization of said energizable element to open said first and second control circuits.

10. An electric control system for a machine provided with a tool having an estimated life which is a function of the work performed thereby, a primary control circuit for said machine, a second control circuit, first and second normally closed switches, each in a respective one of said circuits, an actuator for said switches, an energizable element in said second circuit operatively connected to said switch actuator, and means in said second circuit operable as a function of work performed by said tool to energize said energizable element for fixed predetermined time intervals.

11. In an electrical control system for a machine having a tool which has an estimated life the magnitude of which is a function of the work performed thereby, at least one switching apparatus including a circuit-controlling device and an energizable time-integrating element, said integrating element being operatively associated with said circuit-controlling device to actuate said circuit-controlling device subsequently to a predetermined integrated time period, a first control circuit for such machine including a portion of said circuit-controlling device, said portion normally being effective to maintain said circuit in a normal condition to render such machine in a condition to perform its intended function, a timing element, a second control circuit including said integrating element and said timing element and a portion of said controlling device, a second circuit-controlling device actuatable from a first circuit-controlling condition to a second circuit-controlling condition as a function of the work performed by such tool, said second circuit-controlling device being associated with said second circuit and effective when said second circuit is in its normal condition to actuate said timing element whereby said integrating element is energized for a predetermined time integral as a function of work performed by such tool, said first-named circuit-controlling device being operable as a consequence of its actuation by said integrating element to render said first circuit in a condition to render said machine ineffective to perform its intended function and also to render said second circuit ineffective to actuating said integrating element.

12. An electrical timing network for controlling the operation of a machine including at least two tools having different estimated lives comprising at least a pair of electrically energizable devices, an actuator individually associated with each device and having a first and a second operating condition, each of said actuators being normally maintained in its first operating condition and rendered into its second operating condition as a function of the energization of its respective device, switch means individually associated with each actuator and moved from a first circuit-controlling position to a second circuit-controlling position as a consequence of its respective actuator being actuated from its first to its second operating condition, a first electric circuit controlling the operation of such machine and including a first portion of each of said switch means arranged to render said circuit in a first operating condition solely when all of said switch means are in their respective first circuit-controlling positions, a plurality of control circuits, each said control circuit being individual to and including an individual one of said energizable devices and further including a second portion of the respective switch means associated with the respective energizable devices, each control circuit being effective to energize its respective energizable device solely when its respective switch means is in its first circuit-controlling position, a master circuit controller arranged to be associated with such machine and actuated from a first to a second operating condition as a function of the operation of the tools of such machine, and a master circuit including said master circuit controller and said control circuits for controlling the energization of said control circuits as a consequence of the actuation of said master circuit controller from one of its operating conditions to the other of its operating conditions.

13. The combination of claim 12 in which at least one of said control circuits is provided with a proportioning switch and an energizable actuator is provided for controlling said proportioning switch and energized as a consequence of the operation of said master circuit controller, said last-named actuator being operable upon energization to control said proportioning switch whereby the one of said control circuits which is provided with said proportioning switch is subject to control thereby as well as by said master circuit controller.

14. An electrical timing network for controlling the operation of a machine including at least two tools having different estimated lives comprising at least a pair of electrically energizable time-integrating devices, a switch actuator individually associated with each device and movable from an initial to a switch-operating position as a function of the length of time said device is actuated, a pair of normally closed switches individually associated with each switch actuator and movable from a circuit closed position to a circuit open position as a consequence of its respective switch actuator being moved to its switch-operating position, a first electric circuit controlling the operation of such machine and including a first switch of each pair of switches arranged in series circuit whereby such machine is rendered in a first operating condition solely when all of said first switches are in their respective circuit-closed positions, a plurality of control circuits, each said control circuit being individual to and including an individual one of said integrating devices and further including a second switch of the respective pair of switches associated with the respective integrating devices, each control circuit being effective to energize its respective integrating device solely when its respective second switch is in its closed-circuit position, a normally open master switch arranged to be associated with such machine and actuated from an open to a closed position as a function of the number of times the tools of such machine are used, and a master circuit including said master circuit switch for energizing said control circuits for a predetermined time interval each time said master switch is closed.

15. The combination of claim 14 in which at least one of said control circuits is provided with a proportioning switch and a time integrating device is provided for controlling said proportioning switch and rendering said proportioning switch in its open and closed postions as a function of the integrated time that said last-named time device is energized.

16. Apparatus for programing tool changes for a machine tool of the type having a tool adapted to perform work on a workpiece and including a member operable in timed relation to and in accordance with the work performed on said workpiece comprising a dial, means on said dial designating a life span of said tool, an electrically operated mechanism including a pointer on and rotatable relative to said dial, said pointer being initially manually rotatable to a selected starting position on the dial representing the estimated life span of said tool, an electric circuit for said mechanism, means operable by said member and controlling said circuit for energizing said mechanism periodically in accordance with work performed by the tool to move said pointer successively and progressively from said starting position and relative to said dial, adjustable stop means coactive with said pointer to position the same initially relative to said dial, and means on said dial coactive with said pointer for designating when a predetermined time interval in terms of machine operation remains of the estimated life span of said tool.

17. Apparatus for programing tool changes for a machine tool of the type having a tool adapted to perform work on a workpiece and including a member operable in timed relation to and in accordance with the work performed on said workpiece comprising a scale having means thereon designating a life span of said tool, an electrically operated mechanism including a pointer on and movable relative to said scale, said pointer being initially manually movable to a selected starting position on the scale representing the estimated life span of said tool, an electric circuit for said mechanism, means operable by said member and controlling said circuit for energizing said mechanism periodically in accordance with tool operation to move said pointer successively and progressively from said starting position and relative to said scale, adjustable stop means coactive with said pointer to position the same initially relative to said scale, and means on said scale coactive with said pointer for designating when a predetermined time interval in terms of machine operation remains of the estimated life span of said tool.

18. Apparatus for programing tool changes for a machine tool of the type having a tool adapted to perform work on a workpiece and including a member operable in timed relation to and in accordance with the work performed on said workpiece comprising a scale having means thereon designating a life span of said tool, an electrically operated mechanism including a pointer on and movable relative to said scale, said pointer being initially manually movable to a selected starting position on the scale representing the estimated life span of said tool, an electric circuit for said mechanism, means operable by said member and controlling said circuit for energizing said mechanism periodically in accordance with work performed by said tool to move said pointer successively and progressively from said starting position and relative to said scale, and means on said scale coactive with said pointer for designating when a predetermined time interval in terms of machine operation remains of the estimated life span of said tool.

19. Apparatus for programing tool changes for a machine tool of the type having a tool adapted to perform work on a workpiece and including a member operable in timed relation to and in accordance with the work performed on said workpiece comprising a scale having means thereon designating a life span of said tool, mechanism including an indicator on and movable relative to said scale, said indicator being movable to a selected starting position on the scale representing the estimated life span of said tool, means operable by said member for actuating said mechanism periodically in accordance with work performed by said tool to move said indicator successively and progressively from said starting position and relative to said scale, and means on said scale coactive with said pointer for visually designating the remaining life span of said tool in terms of machine operation.

20. Apparatus for programing tool changes for a machine tool of the type having a tool adapted to perform work on a workpiece and including a member operable in timed relation to and in accordance with the work performed on said workpiece comprising means for designating a life span of said tool including an indicator movable to a selected starting position and coactive with said member periodically and successively in accordance with work performed by said tool to move successively step by step from said starting position, means coactive with said indicator rendered operative by said step-by-step movement thereof for designating when said life span of said tool is completed, and means coactive with said indicator for visually designating the remaining life span of said tool in terms of machine operation.

References Cited in the file of this patent
UNITED STATES PATENTS

| Number | Name | Date |
|---|---|---|
| 1,158,619 | Baisley | Nov. 2, 1915 |
| 1,992,841 | Roesen | Feb. 26, 1935 |
| 2,111,784 | Johnson | Mar. 22, 1938 |
| 2,346,869 | Poole | Apr. 18, 1944 |
| 2,435,907 | Schirokauer | Feb. 10, 1948 |
| 2,467,944 | Munson | Apr. 19, 1949 |
| 2,518,909 | Krakauer | Aug. 15, 1950 |